INVENTORS
Robert B. Cotton
Donald B. Doolittle.
BY Herbert M. Birch
ATTORNEY

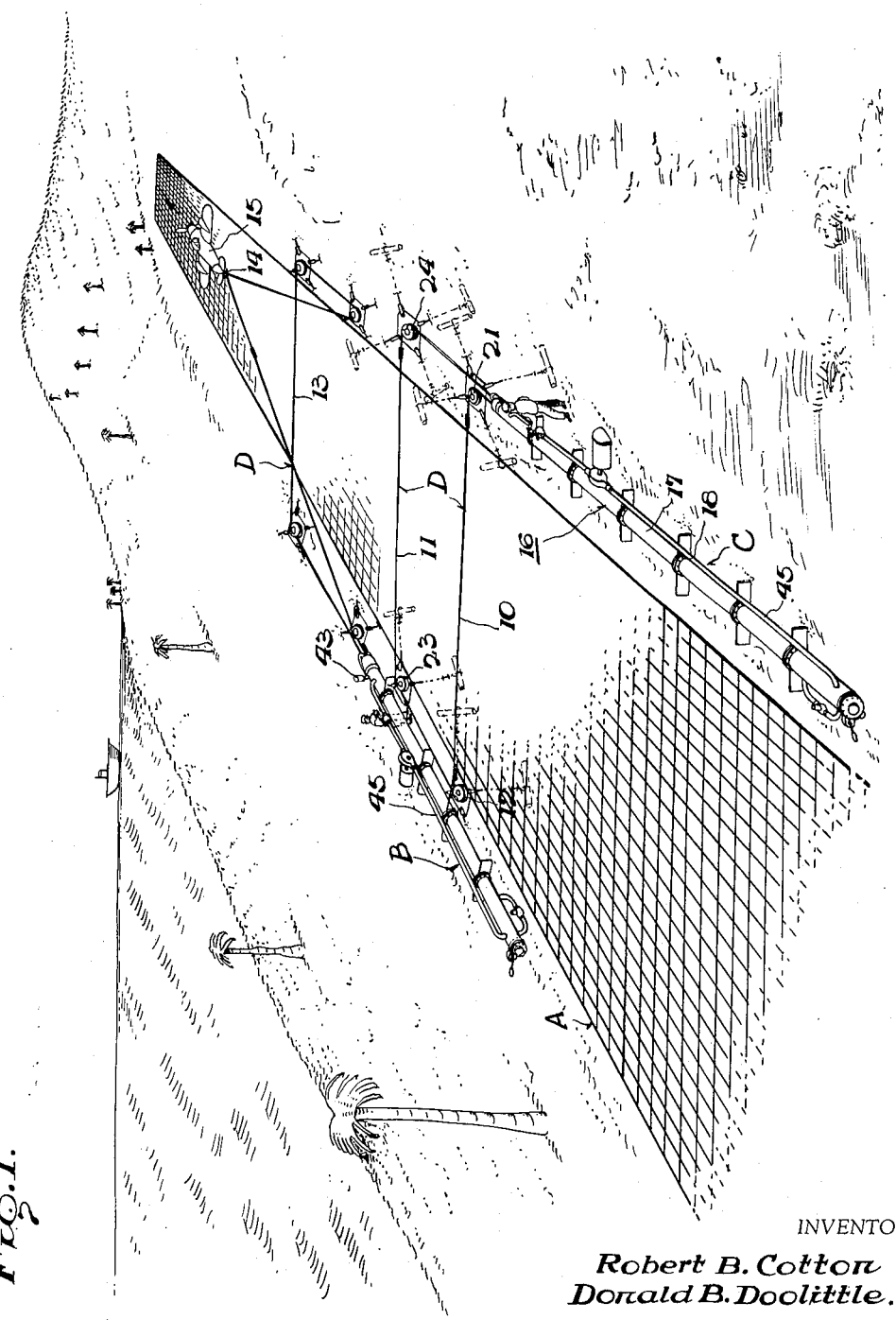

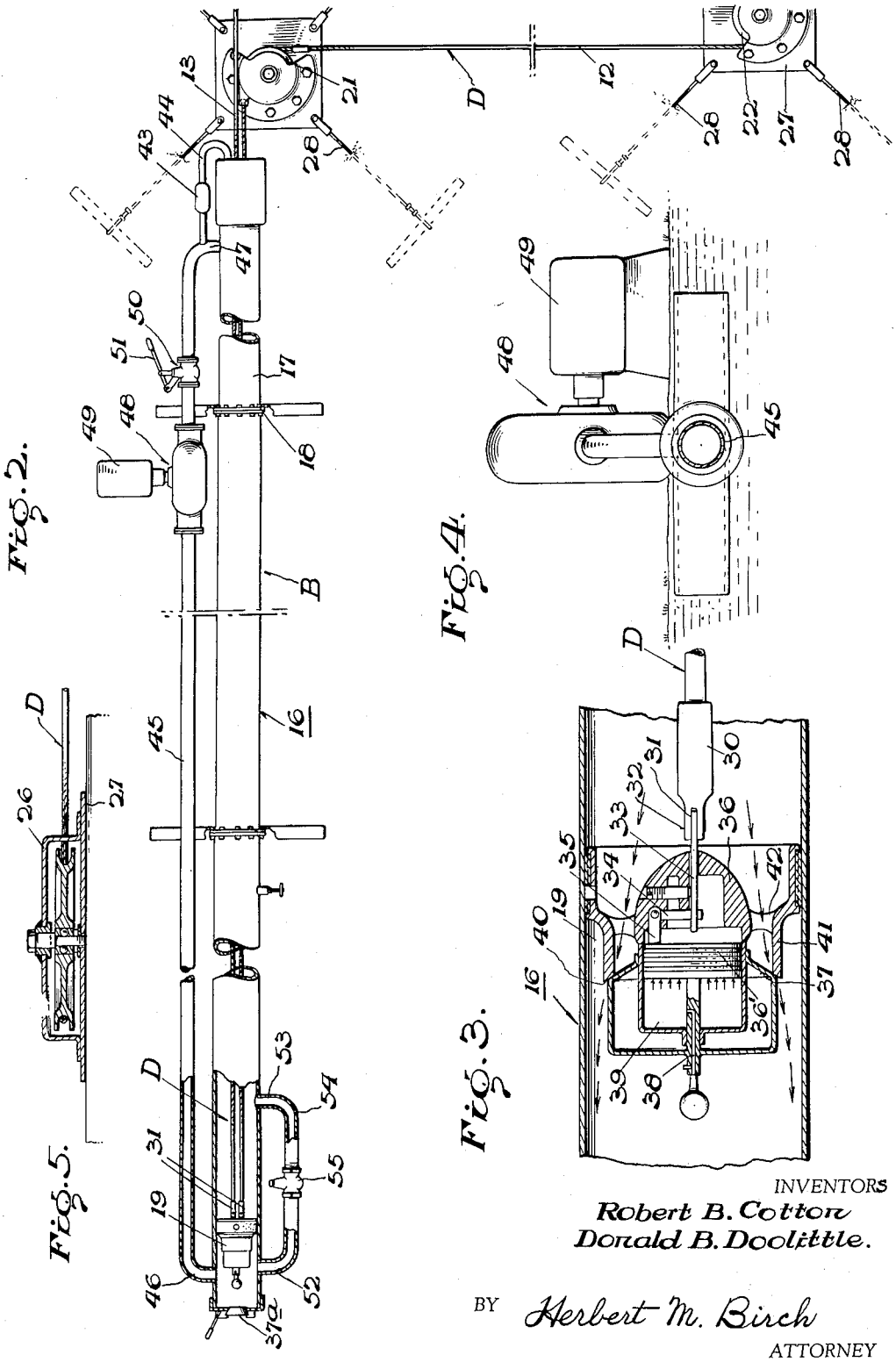

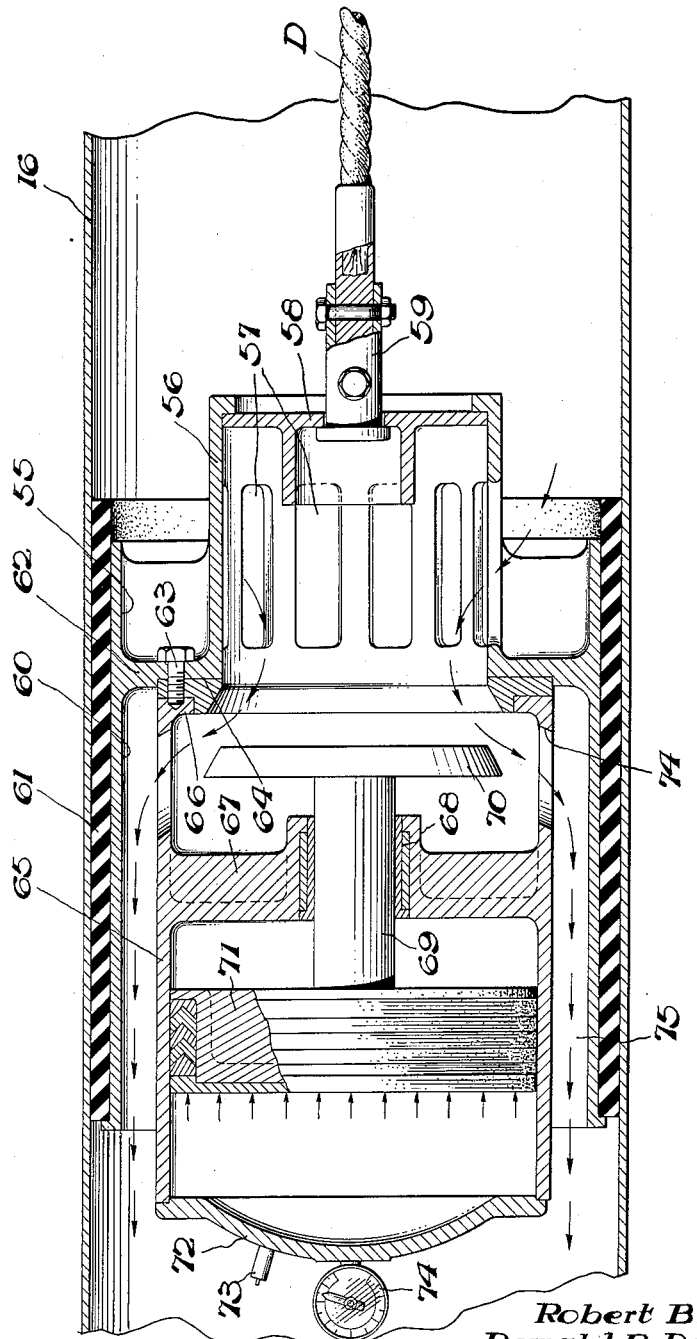

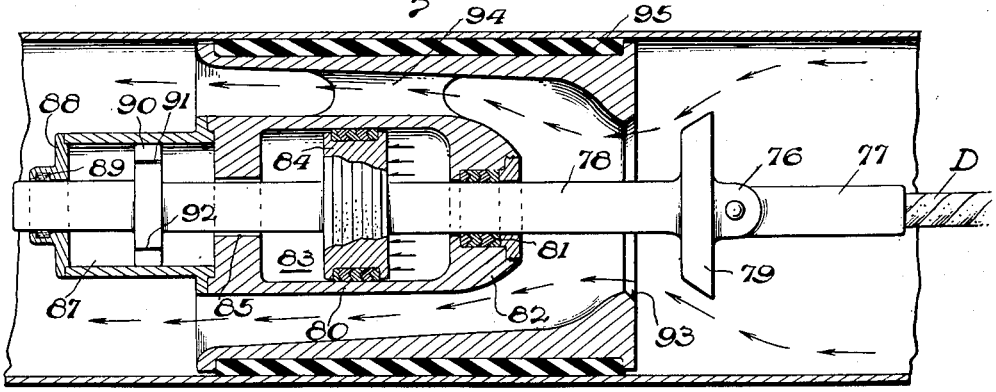
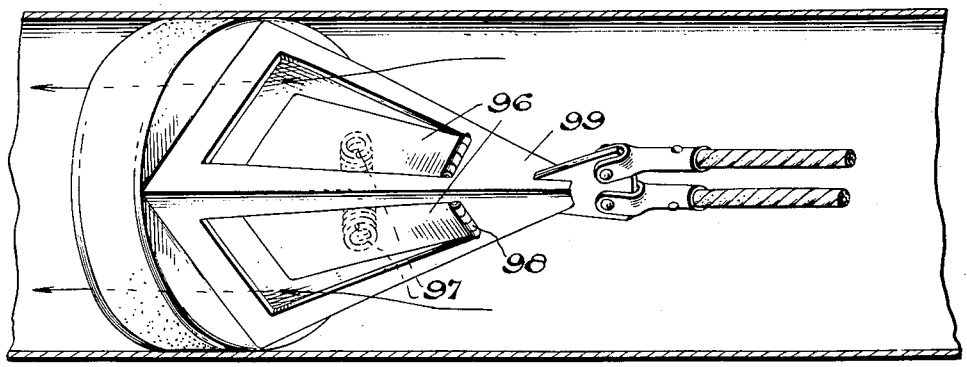
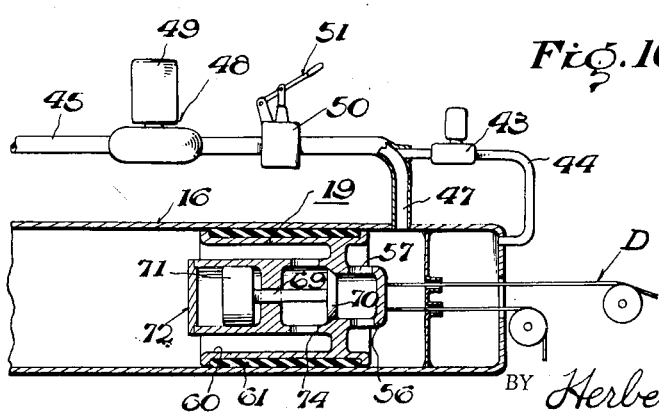
INVENTORS
Robert B. Cotton
Donald B. Doolittle.
BY Herbert M. Birch
ATTORNEY

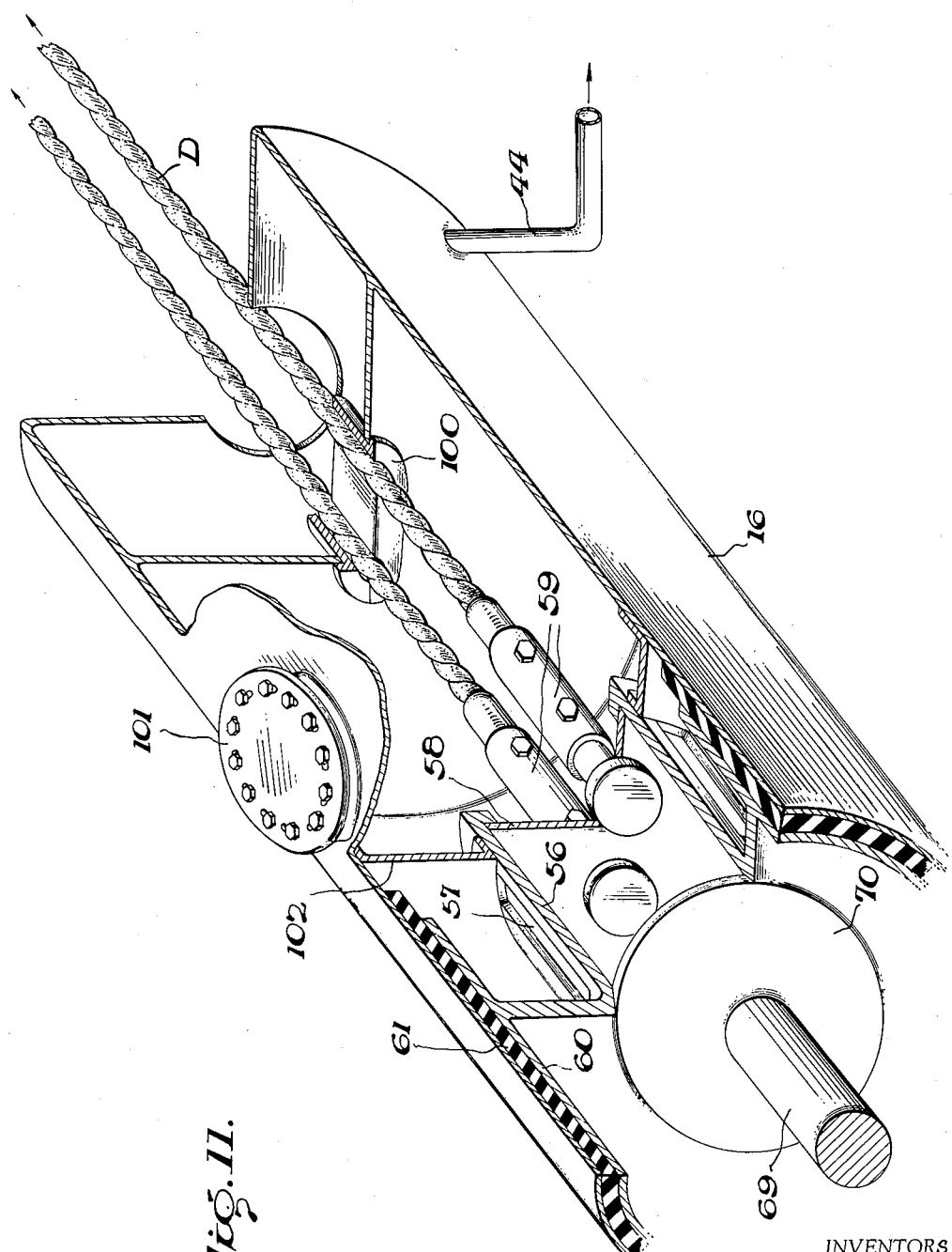

United States Patent Office 2,731,219
Patented Jan. 17, 1956

2,731,219

AIRCRAFT ARRESTING MEANS

Robert B. Cotton, Media, Pa., and Donald B. Doolittle, Wilmington, Del., assignors, by mesne assignments, to All American Engineering Company, Wilmington, Del., a corporation of Delaware Application July 21, 1952, Serial No. 300,014

10 Claims. (Cl. 244—110)

The present invention relates to aircraft arresting means.

An object of the invention is to provide an expeditionary form of arresting gear readily transported and set up in various localities, within a minimum time.

Another object is to provide an aircraft arresting means with a fluid load resisting cylinder and piston connected to an arresting cable or deck pendant engageable by an aircraft carried arresting hook, and a time delay fluid by-pass effective to delay the load resisting action of the piston to the fluid in the cylinder for a predetermined period following initial acceleration caused by engagement of the arresting hook with the arresting cable or deck pendant.

Another object is to provide a fluid arresting system for aircraft comprising a piston in a fluid loaded cylinder, a fluid supply pump for replenishing leakage, a cable retrieving circulating pump, and valve means for causing the fluid to be pumped by the circulating pump from one side of the piston to the other, whereby the cable may be retrieved after each arrest.

A further object is to provide in a hydraulic arresting system, having a cable connected to a piston containing a valve loaded to closed position by pressure, until opened by a relatively greater load caused by a forward pull on the cable, to thereby transmit the load to the piston.

A still further object is to provide a plurality of alternately positioned arresting units on each side of an aircraft runway having a plurality of transverse arresting cables for arresting hook engagement.

Yet another object is to provide an arresting gear of few parts, thereby making the same easy to assemble, transport, durable and highly efficient in action.

Another object is to provide an arresting engine with a reduced moving mass, as compared to other arresting engines, which will reduce the initial cable load caused by acceleration of the moving mass of the engine, thus allowing for satisfactory performance at higher airplane engaging speeds. This is accomplished by elimination of sheaves, incorporation of the valve in the piston and keeping the fluid stationary by passing the valve thru the fluid instead of forcing the fluid through a valve and by the time delay system as described in the following specification.

With the foregoing and other objects in view, the present invention consists of certain novel features of construction, combination and arrangement of parts, as will now be more fully described and particularly defined in the appended claims.

In the drawings, wherein like parts are given like reference numerals and are thus identified throughout the following description:

Fig. 1 is a general layout perspective view of a landing runway with some of the present novel units mounted adjacent thereto for operation;

Fig. 2 is an assembled elevational view partly in cross section of one form of the complete arresting units;

Fig. 3 is a longitudinal cross section view of one form of valved piston used in the arresting device;

Fig. 4 is a transverse section through the fluid cylinder showing the centrifugal circulating pump and motor for driving the same in elevation;

Fig. 5 is a transverse cross section of one of the arresting cable sheaves;

Fig. 7 is a cross section view of a second form of valved piston used in the arresting device;

Fig. 8 is a cross section view of a third form of piston;

Fig. 9 is a cross section view of the cylinder and of a fourth form of piston in elevation;

Fig. 10 is a cross section view of the front end of the cylinder showing the piston's position after an arrest and showing the retrieving and leakage replenishing mechanisms; and Fig. 11 is an enlarged view showing the cable guides and connections to the piston head.

Figure 6:
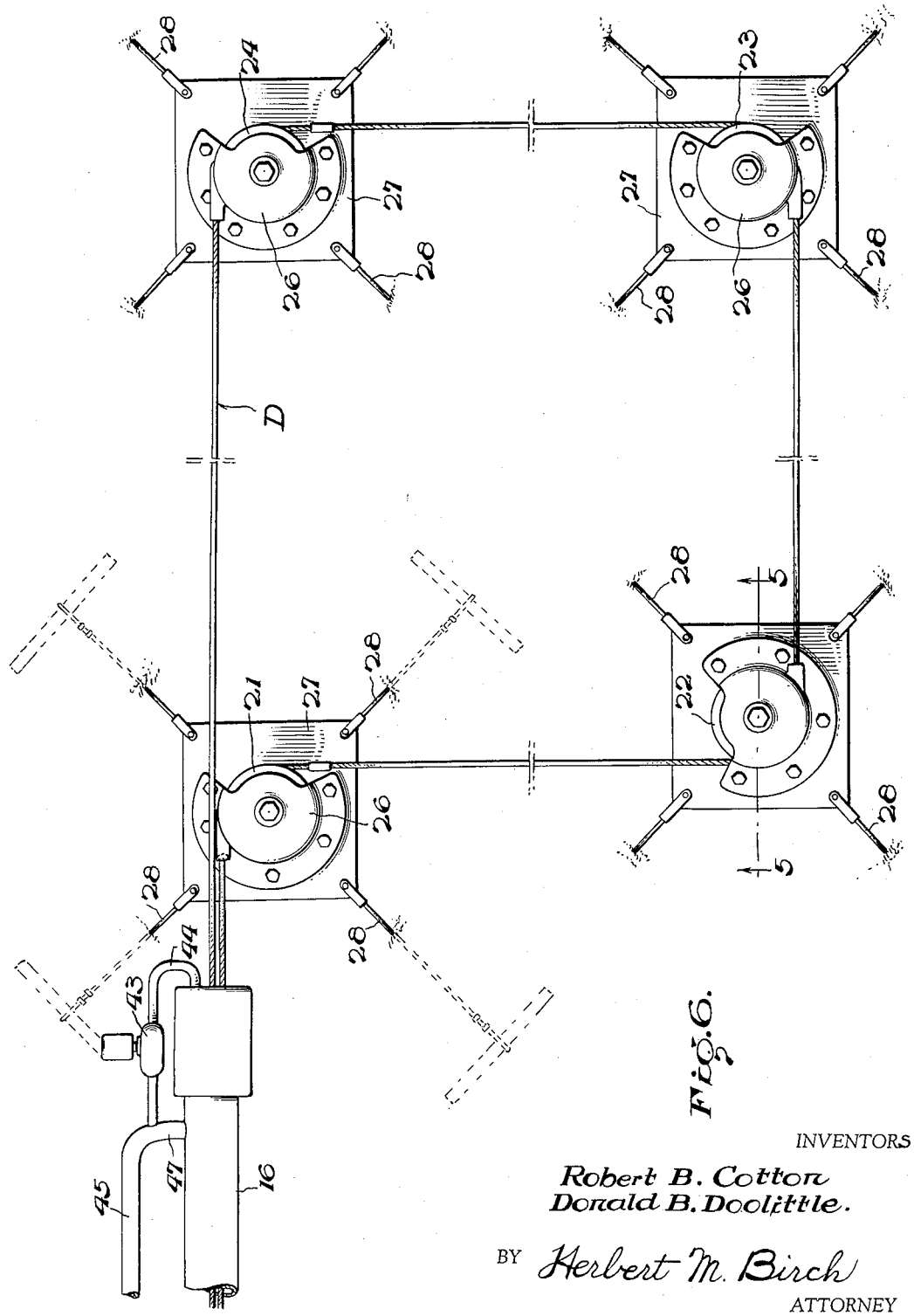
Fig. 6 is a top plan view showing the sheaves and arresting cable in position for an arrest.

Referring to the drawing in detail and first with particular reference to the installation layout of Fig. 1, there is shown any well known aircraft landing deck mat or runway A with the present invention novel arresting gear units B and C arranged longitudinally along alternate sides thereof. The unit B is positioned ahead of the unit C in the direction of travel of the landing aircraft, whereby a series of cross arresting cables or deck pendants 10, 11, 12 and 13 are provided in a manner to have anyone of the same engage with the arresting hook 14 of the aircraft 15.

Each of the units B and C are identical in structure except that B is arranged on the left side of the landing deck A and C is on the right side thereof, and accordingly a detailed description of one unit describes them both.

These units comprise an elongated fluid holding tube or cylinder 16 formed of a plurality of sections 17 with coupling flanges 18 bolted together, see Figs. 1 and 2. Within the cylinder is a piston 19, one form thereof being illustrated in Fig. 3. The piston 19 is a valved piston and the head of the piston is coupled to the cable ends of a deck pendant D looped around rectangularly spaced and positioned sheaves 21, 22, 23 and 24, see Figs. 1, 2, 5 and 6.

Each sheave is shielded by a cover or housing 26 open on the side leading into the deck pendant arresting loop D, which housing is mounted in a base plate 27 and anchored by stay wires 28 to the ground secured from each corner of the base plate. Two coupling ferrules 30 with bifurcated ends 31, see Fig. 3, are arranged side by side to hold the cable ends and said ends 31 are each connected by a pin 32 to a valve actuating lever 33. The lever 33 in turn connects to a bell-crank lever 34 pivoted to the valve head 36, said bell-crank having one arm 35 in endwise abutment with the valve loading piston 36' of the valve 37.

The valve 37 is pressure loaded to its seat 40 by suitable means, such as fluid inlet conduit 38 leading from a pressure source into the hollow loading chamber 39 rearward of the valve loading piston 36'. The valve seat 40 is formed on the rearwardly extending skirt 41 spaced apart from the center of the valve head 36 by a spider structure 42 through which fluid may pass to force open the valve 37 at predetermined arresting loads. Also, it is to be noted that when load is applied to the cable or arresting loop D, the valve 37 is "cracked" or boosted open by the bell-crank arm 35.

The present system is a fluid system constantly maintained loaded with fluid by a replenishing pump 43 in line 44, see Fig. 2. This pump is large enough to only provide an output sufficient to replenish the leakage at the cable outlets and calibrated low enough in output so as not to cause premature retrieving of the cable at the end of the arrest. In the present system the fluid is kept stationary by passing a valved piston through the fluid instead of forcing the fluid through a valve. In order to adjust the valve and piston and etc., a closure 39ª is provided in the cylinder head, see Fig. 5.

Retrieving equipment

The retrieving of the cable after an arrest is accomplished by the by-pass conduit 45 extending from side connections 46 at the tail end of the cylinder assembly longitudinally and parallel thereto into side connection 47 at the head of the cylinder assembly. The conduit 45 at the junction with side connection 47 connects to the replenishing line 44 as in Figs. 2, 6 and 10 to the head of the cylinder. Interposed in the retrieving conduit 45 is a pump, such as a centrifugal pump 48 driven by a suitable motor 49 and interposed in the conduit 45 between the output side of the pump and the side connection 47 is a retrieving control valve 50, such a gate valve with an operating lever 51.

Initial acceleration time delay

Connected into the side of the cylinder 16 at the tail end by connections 52 and 53 and preferably on an opposite side from the connection 46 is a time delay by-pass line 54, which may have interposed in the line a relief valve 55 set to blow off at about 125 p. s. i. With the initial pull on the cable and forward movement thereby imparted to the piston the fluid is allowed to by-pass through the time delay tube, until the piston passes the port of connection 53. After passing the port at 53 the fluid must then pass through the fluid loaded valve in the piston 19 as the result of the cable payout. For example at maximum cable load the pressure built up in the cylinder is approximately 1600 p. s. i. and the fluid or air loaded valve keeps the cable load substantially constant.

Different forms of piston and valve structures may be used in the system. For example, a second form of piston with an air loaded valve is illustrated in Fig. 7. This form comprises a head portion 55 with a hollow cylindrical nose 56 formed with fluid intake ports 57 and a leading end plate 58 formed with apertures to hold the headed cable couplers 59. The shell 60 of the piston is surrounded by a packing ring 61 and is interiorly formed with an integral flange 62 to which is secured as by bolts 63 a valve seat 64. A hollow valve body 65 is concentrically mounted within the piston shell in rim abutting engagement with the shouldered flat face of the valve seat 64. The rim of the hollow valve body is formed with a flange 66 into which threads the end of the valve seat securing bolts 63. In the piston shell above the valve seat is a wall 67 with a central bearing opening and bearing 68 for the reciprocating valve shaft 69. One end of this shaft supports the valve 70 while the opposite end supports a piston 71 movable in the interior of the piston shell 65, which shell is sealed by a dome 72 ported to receive an air inlet valve 73 of the well known vehicle tire type and to mount a fluid pressure gage 74.

As shown in Figs. 7 and 11 when load is imparted by the cable load to the piston, fluid follows the path of the arrows through the elongated ports or slots 57 in the nose 56 to force the valve 70 from its seat against the air load on the piston 71, whereby the fluid passes out of openings 74 in the side walls of the hollow valve body to the open exhaust chamber 75 defined between the exterior wall of the hollow valve body 65 and the interior wall of the piston shell 60.

A third form of piston and valve is illustrated in Fig. 8, and shows the valve per se formed with lug connections 76 to the cable couplers 77. The stem 78 of the valve 79 reciprocates in a concentrically mounted hollow valve body 80 formed with a stuffing gland 81 in the leading end wall 82 adapted to fluid seal an air chamber 83 having a piston 84 through which the valve shaft or stem 78 extends. Preferably the stem 78 extends through a second gland 85 in wall 86 and through a hydraulic valve damping chamber 87 having an end wall 88 with a shaft packing gland 89. Formed in the shaft 78 in the chamber 87 is a second piston 90 formed with bleed holes 91 and 92 to permit restricted flow of the damping fluid therethrough. As shown by the arrows fluid from the cylinder passes by the valve 79 and seat 93 at the head of the piston around the exterior of the hollow valve body 80 through the interior of the piston shell and exhausts out the rear thereof. The hollow valve body 80 is supported concentrically within the piston shell by a spider 94. This piston also is formed with a packing ring 95 as in the prior forms.

A fourth form of piston and valve arrangement is illustrated in Fig. 9, wherein air loaded or spring loaded pivoted valve vanes 96 are utilized instead of the poppet valves of the other forms. For example, this figure shows loading springs 97. These valves are mounted on hinges 98 in a hollow pyramid valve body 99.

Referring to Fig. 11, and again to Fig. 7 there are shown in detail a split cable guide 100, a reservoir-sump in the head of the main cylinder and an access cap 101 to facilitate cable change. Also, when changing cable a sealing bulkhead 102 may be utilized to prevent loss of fluid during cable change.

After an arrest has been made the piston will be forward in cylinder 16 as illustrated in Fig. 10 and the cable is then retrieved by fluid through valve 50 and connection 47 to the head of the piston 19. The particular form shown is that illustrated in Fig. 7.

Operation

The arrest is made upon engagement of the deck pendant D by the arresting hook of an aircraft 15, which exerts a load on the cable of the pendant. This load is transmitted to the piston 19. During the first few feet of cable payout the fluid is allowed to bypass through the time delay by-pass, so that a hydraulic load only sufficient to pre-tension the cable, approximately 100 p. s. i. will be exerted in the cable during initial acceleration of the cable. After sufficient payout pulls the piston past the time delay by-pass port the fluid must pass through the fluid loaded valve incorporated in the piston 19 and resistance is thus set up to arrest the aircraft.

As previously stated, at maximum cable load the pressure built up in the cylinder is approximately 1600 p. s. i. and during the cable payout the cable load is substantially constant as determined by the fluid load constant pressure valve incorporated in the piston.

Any leakage during use is replenished by the above described replenishing pump.

After the arrest the piston is forward as in Fig. 10 and when the cable is removed from the arresting hook the cable is retrieved. This is accomplished by opening the gate valve, which allows the centrifugal pump to pump the fluid from one side of the piston to the other. This pump may be operated continuously during landing operations.

Without further description it is believed that the present invention is clearly understandable to others authorized to practice the same. While only four embodiments of the invention are described and illustrated in detail, it is to be expressly understood that other combinations, modifications and arrangements of the parts which will now probably occur to others skilled in the art are to be considered a part hereof. To determine the scope of the present invention, reference should be had to the appended claims.

We claim:

1. Aircraft arresting means for operative association with a landing deck or the like, comprising an elongated fluid loaded horizontal cylinder fixed longitudinally adjacent a side of the said deck or the like, a piston with fluid exhaust openings therein adapted to reciprocate in said cylinder, a valve in said piston controlling said exhaust openings, a cable connected to one end of the piston, said cable having its ends secured to the piston and extending through an end of the cylinder and looped around two pairs of spaced apart sheaves, one pair of each sheave being on an opposite side of the said deck or the like, thereby forming a deck pendant comprising spaced parallel line sections across the deck for engagement by an aircraft carried arresting hook, time delay by-pass ports in one end of the cylinder, and a time delay means comprising a time delay by-pass tube connected between the said by-pass ports whereby initial acceleration of the cable during an arrest causes fluid to flow through said by-pass tube, until the piston is pulled past the last by-pass port.

2. Aircraft arresting means for operative association with a landing deck or the like, comprising an elongated fluid loaded horizontally mounted cylinder fixed longitudinally adjacent a side of the said deck or the like, a piston with fluid exhaust openings therein adapted to reciprocate in said cylinder therein, a valve in said piston controlling said exhaust openings, a cable connected to one end of the piston, said cable having its ends secured to the piston and extending through an end of the cylinder and looped around two pairs of spaced apart sheaves, one pair of each sheave being on an opposite side of the said deck or the like, thereby forming a deck pendant comprising spaced parallel line sections across the deck for engagement by an aircraft carried arresting hook, time delay by-pass ports in one end of the cylinder, a time delay means comprising a time delay by-pass tube connected between the said by-pass ports whereby initial acceleration of the cable during an arrest causes fluid to flow through said by-pass tube, until the piston is pulled past the last by-pass port, a fluid power by-pass conduit opening into ports adjacent each end of the cylinder, a fluid circulating pump in the conduit, valve means in the line on the output side of the pump adapted to return the piston to initial position after an arrest and thereby retrieve the cable.

3. Aircraft arresting means for operative association with a landing deck or the like, comprising an elongated fluid loaded horizontally mounted cylinder fixed longitudinally adjacent a side of the said deck or the like, a piston with fluid exhaust openings therein adapted to reciprocate in said cylinder therein, a valve in said piston controlling said exhaust openings, a cable connected to one end of the piston, said cable having its ends secured to the piston and extending through an end of the cylinder and looped around two pairs of spaced apart sheaves, one pair of each sheave being on an opposite side of the said deck or the like, thereby forming a deck pendant comprising spaced parallel line sections across the deck for engagement by an aircraft carried arresting hook, time delay by-pass ports in one end of the cylinder, a time delay means comprising a time delay by-pass tube connected between the said by-pass ports whereby initial acceleration of the cable during an arrest causes fluid to flow through said by-pass tube, until the piston is pulled past the last by-pass port, a fluid power by-pass conduit opening into ports adjacent each end of the cylinder, a fluid circulating pump in the conduit, valve means in the line on the output side of the pump adapted to return the piston to initial position after an arrest and thereby retrieve the cable, and a replenishing pump for compensating leakage loss connected from source of fluid supply to the said cylinder.

4. An aircraft arresting unit having a fluid loaded stationary cylinder mounted in a horizontal plane adjacent a landing surface, a hollow piston in the cylinder, said piston comprising a head portion with a hollow cylindrical nose formed with fluid inlet ports, an apertured end plate carried by the said nose, cable couplers secured to the said end plate, a hollow valve supporting body concentrically mounted in the piston including a valve seat rearward of the said inlet ports, a valve in said body engageable with the said seat and auxiliary fluid responsive means adapted to normally load said valve to closed position.

5. An aircraft arresting unit having an arresting cable, a fluid loaded stationary cylinder mounted in a horizontal plane adjacent a landing surface, a hollow piston in the cylinder, said piston comprising a head portion with a hollow cylindrical nose formed with fluid inlet ports, cable couplers secured to said piston at the said nose, a valve supporting body rearward of the nose mounted concentrically in the piston including a valve seat rearward of said inlet ports, a valve engageable with said seat carried by the said body, a valve loading fluid chamber and means for supplying fluid into said chamber to maintain said valve in closed position until released by a relatively greater counter force resulting from pull on said arresting cable.

6. A portable hydraulic arresting unit comprising a horizontally fixed cylinder formed of tubular sections coupled together in fluid tight relation, a piston in said cylinder, the head and tail sections of the cylinder being capped to seal the ends, said head section cap having cable guides mounted therein, cable sections extending through the guides to form a deck pendant and being coupled to said piston by cable couplings in said cylinder, and an access means in the wall of the cylinder adjacent the cable couplings to facilitate cable change.

7. In an aircraft arresting engine having a horizontal stationary fluid filled elongated tube, a combined arresting and retrieving piston, said piston having a nose portion formed with openings, a link in each opening projecting into the piston, a cable coupler connected to each link, at least one of said links connecting to an arm of a valve actuating bell-crank lever, a second piston in the body of said first piston, one arm of said bell-crank lever engaging said second piston, a valve operatively associated with said second piston and a fluid chamber for said second piston normally serving to load said valve to closed position, said arm of the bell-crank lever engaging the said second piston thereby serving to boost said valve open upon a pull on the cable coupler.

8. An arresting engine comprising a movable piston and a fixed cylinder therefor, said cylinder being mounted in a horizontal plane adjacent a landing surface a cable connected to the said piston, said cylinder being loaded with fluid normally in a substantially quiescent state, a fluid supply pump for replenishing leakage from the cylinder, said pump being connected to said cylinder by a supply conduit, a cable retrieving circulating pump connected by a conduit to each end of the cylinder, and valve means for directing the fluid being pumped by the circulating pump into the forward end of the cylinder ahead of the said piston therein, whereby the cable may be retrieved after an arrest is made.

9. An aircraft arresting unit comprising a horizontally fixed cylinder loaded with normally non-circulating fluid, a hollow piston movable in said fixed cylinder, an arresting cable connected to the head of said piston, said cable being engageable by the arresting hook of an aircraft, a valve in the piston adapted to be opened to permit the piston to travel through the said fluid to the end of the said fixed cylinder when the cable imparts forward pull on the piston during the arrest of a landing aircraft, and a time delay fluid by-pass line connected to a relatively small portion of the cylinder effective to delay the load resisting action of the fluid to the piston in said small portion of the cylinder during initial cable acceleration.

10. Means for arresting mobile objects traversing a surface comprising a sealed elongated liquid-filled tube formed of tubular sections coupled together in substantially fluid-tight relation and having a smooth internal bore with an arrest and a retrieving end, an arresting piston in said bore, said piston having an arrest end and a retrieve end, a cable connected to the arrest side of the piston, said piston being shaped and proportioned with respect to the tube bore to thereby permit the same to be pulled by the cable through the bore and progressively displace the liquid in the path of travel of said piston, said cable extending from the arrest end of the tube and forming a surface pendant, said piston while being pulled through the liquid, absorbing energy and thereby arresting a mobile object travelling on the surface and coupled to said surface pendant.

References Cited in the file of this patent

UNITED STATES PATENTS

| | | |
|---|---|---|
| 2,360,755 | Boor | Oct. 17, 1944 |
| 2,474,858 | Nicholson | July 5, 1949 |
| 2,483,655 | Schultz | Oct. 4, 1949 |
| 2,537,491 | Thornhill | Jan. 9, 1951 |